United States Patent [19]

Zink

[11] Patent Number: 5,179,747
[45] Date of Patent: Jan. 19, 1993

[54] PILLOW RADIO APPARATUS

[76] Inventor: Robert C. Zink, P.O. Box 4406, State Line, Nev. 89449

[21] Appl. No.: 835,362

[22] Filed: Feb. 14, 1992

[51] Int. Cl.⁵ .................. A47G 9/00; G11B 31/00
[52] U.S. Cl. ............................. 5/639; 5/644; 5/455; 5/904; 381/90; 381/188; 381/205
[58] Field of Search ........... 5/639, 904, 644, 455; 381/188, 24, 90, 205; 455/344

[56] References Cited

U.S. PATENT DOCUMENTS

| 1,712,158 | 5/1929 | Neal | 5/639 |
| 4,862,438 | 8/1989 | Fry | 5/639 |
| 5,072,429 | 12/1991 | Mair | 5/639 |

FOREIGN PATENT DOCUMENTS

| 2536076 | 3/1977 | Fed. Rep. of Germany | 358/18 |
| 2554657 | 5/1985 | France | 455/89 |
| 276057 | 9/1927 | United Kingdom | 5/455 |
| 481540 | 3/1938 | United Kingdom | 5/455 |
| 999217 | 7/1965 | United Kingdom | 5/639 |

Primary Examiner—Alexander Grosz
Attorney, Agent, or Firm—Leon Gilden

[57] ABSTRACT

A pillow including a top and bottom fibrous web defining a casing includes a radio mounted within the casing cooperating with a remotely located speaker. The pillow further includes the speaker mounted within a speaker housing, including fluid filled walls, and where the housing cavity includes compressible fluid capsules to accommodate impact to the speaker unit. The pillow structure may further be provided with a serpentine pneumatic chamber filled with further compressible fluid capsules to afford comfort and cushioning to a user, as well as components of the radio-clock system.

2 Claims, 4 Drawing Sheets

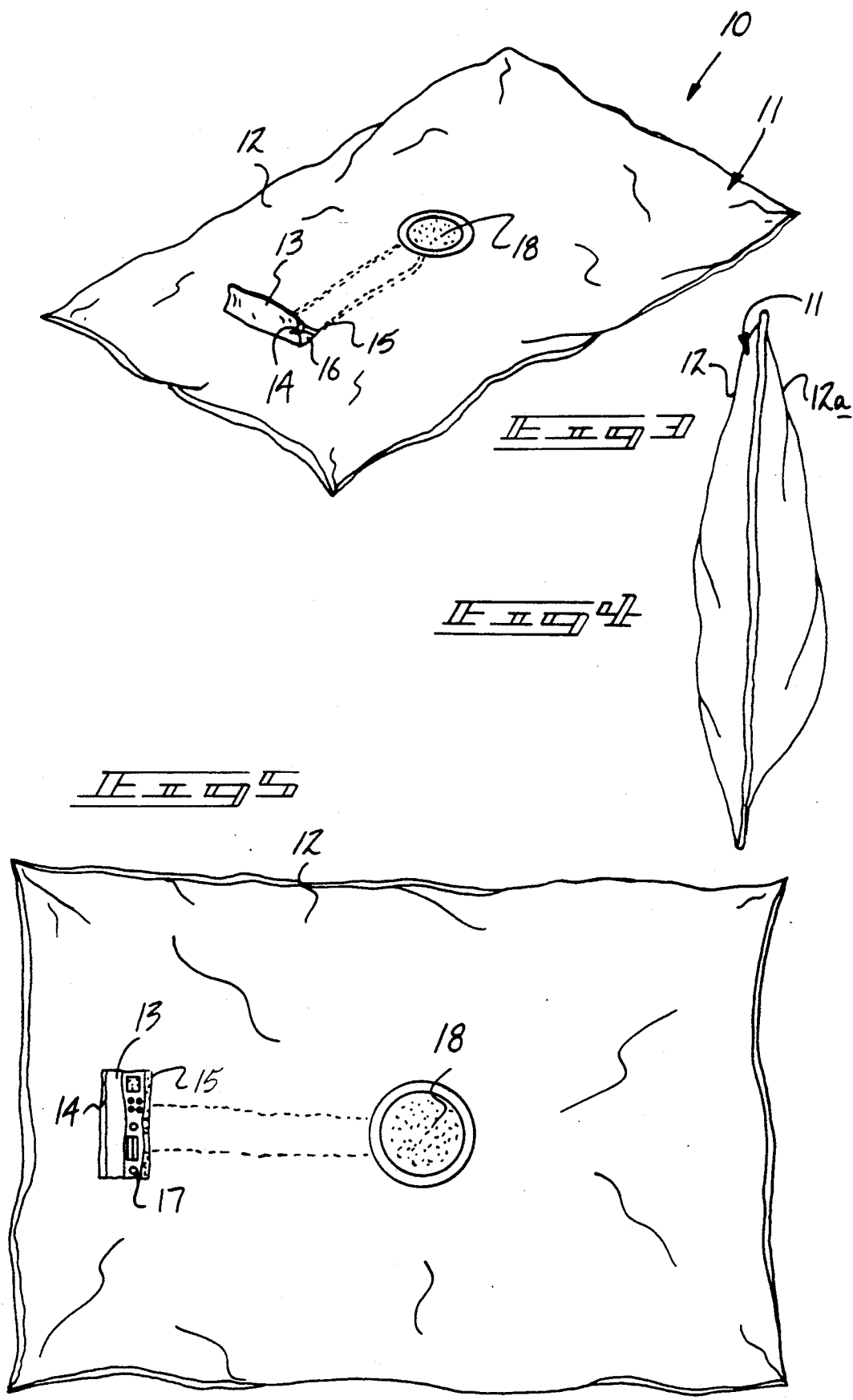

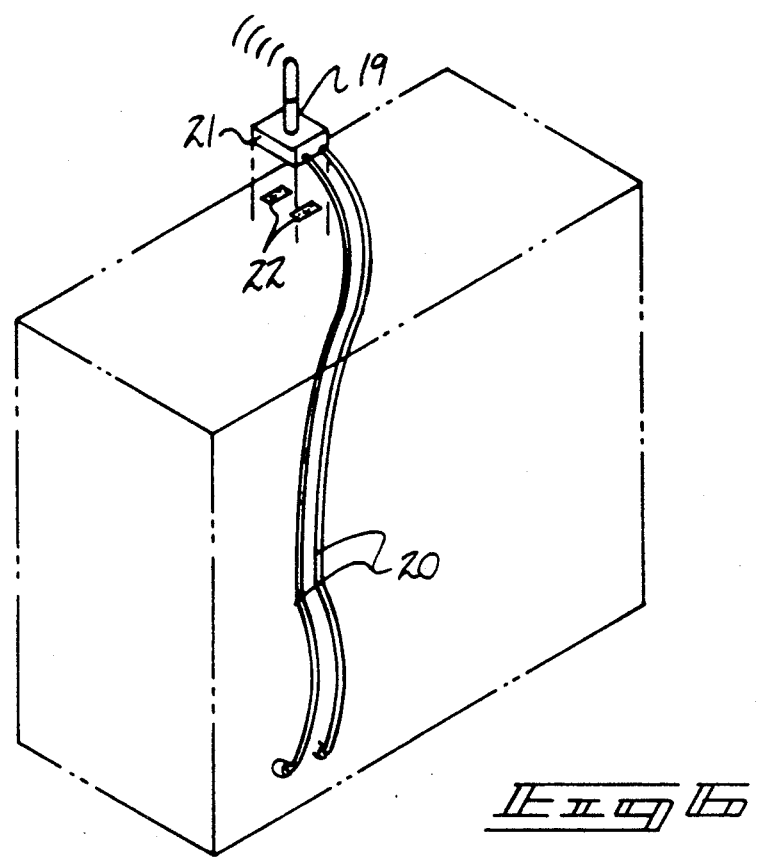
Fig 6
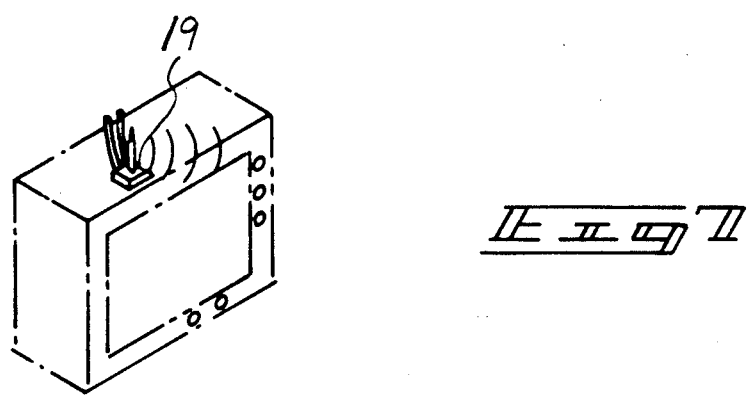
Fig 7
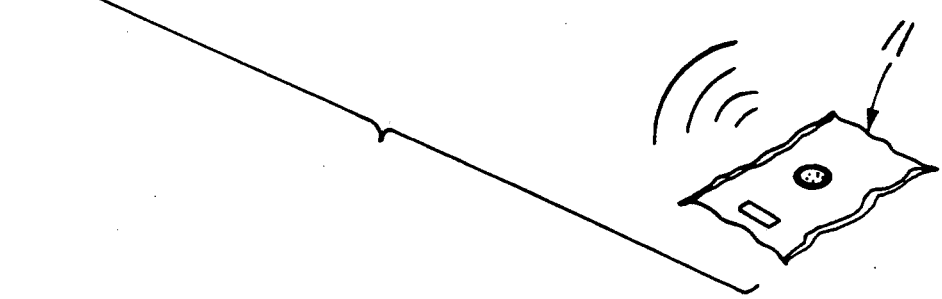

PILLOW RADIO APPARATUS

BACKGROUND OF THE INVENTION

1. Field of the Invention

The field of invention relates to pillow apparatus, and more particularly pertains to a new and improved pillow radio apparatus wherein the same is arranged to provide convenience and utility in the positioning of a radio receiver and alarm clock apparatus within a pillow structure for use by individuals.

2. Description of the Prior Art

The use of pillows during traveling, such as by car, train, and the like, by passengers of such self-propelled vehicles results in such passengers seeking comfort such as in sleeping and the like in travel. The instant invention attempts to provide for a convenient, durable and impact resistant structure to provide and coordinate the use of a radio organization for use by individuals in remote traveling locations.

Prior art pillow and radio structure is set forth in U.S. Pat. No. 4,862,438 to Fry wherein an audio signal generating apparatus is mounted within a pillow structure.

U.S. Pat. No. 4,841,587 to Carter, et al. sets forth a mat structure removably mounting a radio within a housing within the mat structure.

U.S. Pat. No. 4,782,533 to Haynie sets forth a stereo pillow speaker utilizing a plurality of speakers in association with a remotely oriented audio signal generator structure.

As such, it may be appreciated that there continues to be a need for a new and improved pillow radio apparatus as set forth by the instant invention which addresses both the problems of ease of use as well as effectiveness and durability in construction and in this respect, the present invention substantially fulfills this need.

SUMMARY OF THE INVENTION

In view of the foregoing disadvantages inherent in the known types of pillow radio apparatus now present in the prior art, the present invention provides a pillow radio apparatus wherein the same utilizes a plurality of shock absorbing components mounted within a pillow structure to accommodate shock and impact during use of the organization. As such, the general purpose of the present invention, which will be described subsequently in greater detail, is to provide a new and improved pillow radio apparatus which has all the advantages of the prior art pillow radio apparatus and none of the disadvantages.

To attain this, the present invention provides a pillow including a top and bottom fibrous web defining a casing including a radio mounted within the casing cooperating with a remotely located speaker. The organization further includes the speaker mounted within a speaker housing, including fluid filled walls, and there the housing cavity includes compressible fluid capsules to accommodate impact to the speaker unit. The pillow structure may further be provided with a serpentine pneumatic chamber filled with further compressible fluid capsules to afford comfort and cushioning to a user, as well as components of the radio-clock system.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pillow radio apparatus which has all the advantages of the prior art pillow radio apparatus and none of the disadvantages.

It is another object of the present invention to provide a new and improved pillow radio apparatus which may be easily and efficiently manufactured and marketed.

It is a further object of the present invention to provide a new and improved pillow radio apparatus which is of a durable and reliable construction.

An even further object of the present invention is to provide a new and improved pillow radio apparatus which is susceptible of a low cost of manufacture with regard to both materials and labor, and which accordingly is then susceptible of low prices of sale to the consuming public, thereby making such pillow radio apparatus economically available to the buying public.

Still yet another object of the present invention is to provide a new and improved pillow radio apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the instant invention.

FIG. 4 is an orthographic side view of the instant invention.

FIG. 5 is an orthographic top view of the instant invention.

FIG. 6 is an isometric illustration of an antenna structure utilized by the invention.

FIG. 7 is an isometric illustration of the invention in use with the antenna structure.

DESCRIPTION OF THE PREFERRED EMBODIMENT

Figure 1:
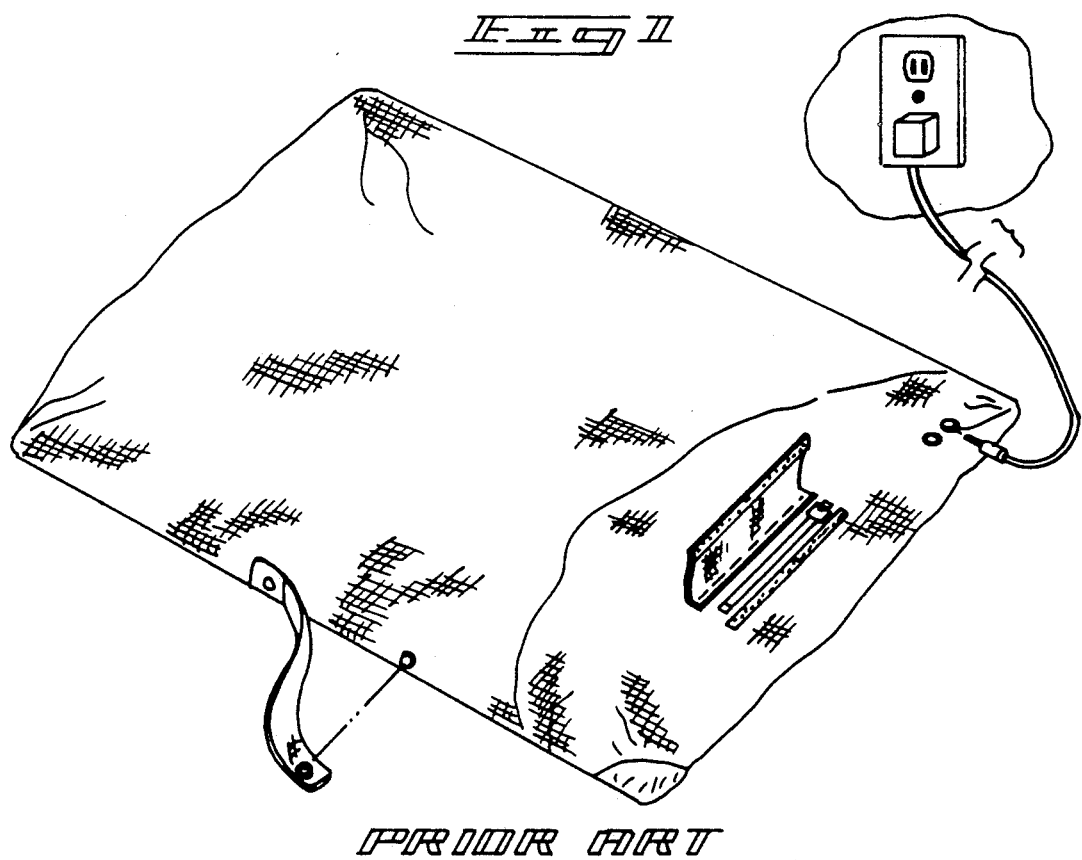
FIG. 1 is an isometric illustration of a prior art pillow radio structure.
Figure 2:
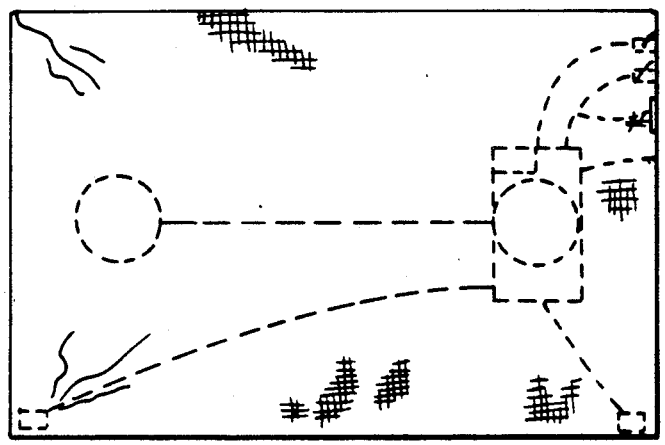
FIG. 2 is a prior art orthographic view of the radio circuit set forth in FIG. 1.

With reference now to the drawings, and in particular to FIGS. 1 to 10 thereof, a new and improved pillow radio apparatus embodying the principles and concepts of the present invention and generally designated by the reference numeral 10 will be described.

More specifically, the pillow radio apparatus 10 of the instant invention essentially comprises a flexible pillow casing 11 including a casing top web 12 coextensive with a casing bottom web 12a to define an enclosure therewithin. A cover flap 13 pivotally directed through the top web 12 provides exposure to a top web window 16. A first hook and loop fastener strip mounted to the cover flap 13 and a second hook and loop fastener strip mounted to the casing top web 12 permit selective closure and securement of the cover flap 13 relative to the top web 12. A radio receiver unit 17 is mounted within the enclosure and exposed through the window 16. The radio receiver unit is operative with a speaker 18 that is medially mounted within the enclosure projecting within the top web 12. The radio receiver unit 17 is of a conventional type including channel selector, on/off switch, and the like, as well as a clock radio arrangement to permit setting of alarm in association with a user of the pillow structure to permit selective awaking of an individual utilizing the pillow of the instant invention.

The apparatus as illustrated in FIGS. 6 and 7 illustrates the use of a television transmitter antenna 19 including connector leads 20 that are directed into the audio output jacks, wherein the antenna body 21 includes adhesive strips 22 to mount the antenna body 21 to the television and permit broadcasting into the radio receive unit 17 minimizing disruption of individuals relative to the user.

Figure 8:
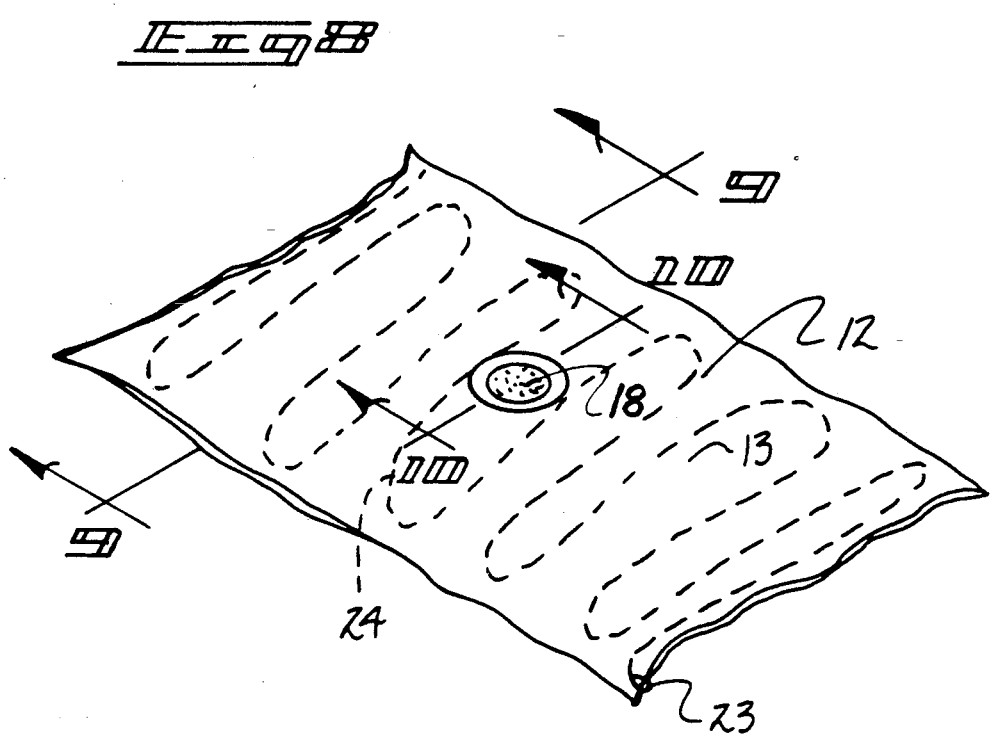
FIG. 8 is an isometric illustration of a modification of the invention.
Figure 10:
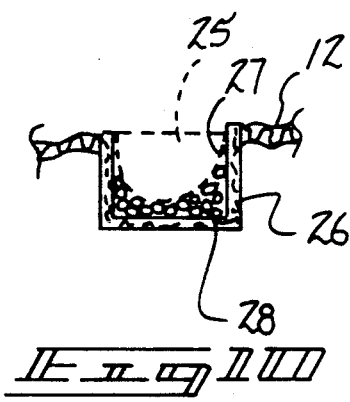
FIG. 10 is an orthographic view, taken along the lines 10—10 of FIG. 9 in the direction indicated by the arrows.
Figure 9:
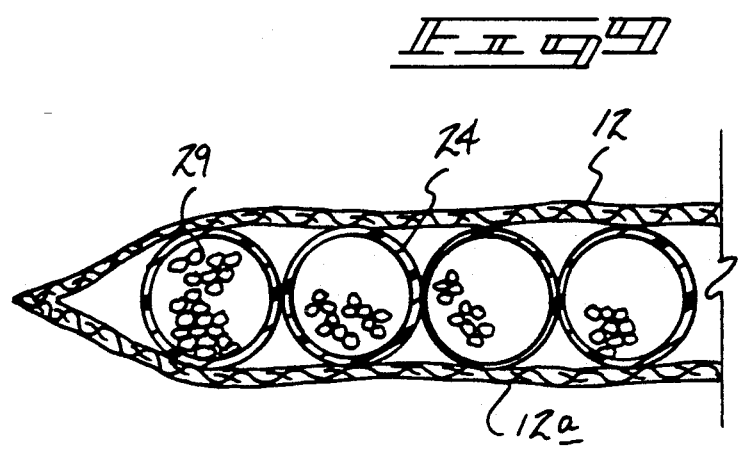
FIG. 9 is an orthographic view, taken along the lines 9—9 of FIG. 8 in the direction indicated by the arrows.

The invention as set forth in the FIGS. 8-10 illustrate the use of a serpentine pneumatic chamber 24 selectively inflated through inflation valve 23 directed through the pillow casing 11. The inflation valve 23 is directed into a seam connecting the top and bottom webs 12 and 12a to minimize obstruction in use of the pillow apparatus. The serpentine pneumatic chamber 24 directed throughout the enclosure is selectively inflated for the comfort of a user and the cushioning of the various components within the enclosure defined by the pillow casing 11. The speaker 25, as illustrated, is mounted within a fluid filled housing 26 formed by hollow walls that are in turn fluid filled to accommodate impact. Further, the speaker housing cavity 27 containing the speaker 25 therewithin includes a matrix of first deformable fluid filled capsules directed therethrough filling the cavity avoiding impact to the speaker. Further, the serpentine pneumatic chamber 24 that is directed coextensively throughout the enclosure within the casing 11 further includes second deformable fluid capsules 29 permitting their compressibility and further providing comfort to a user, as well as cushioning of the components such as the speaker housing 25 of the speaker 18 and the radio receiver unit 17.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pillow radio apparatus, comprising,
   a flexible pillow casing defining an enclosure therewithin, the pillow casing including flexible top web coextensive with and secured to a bottom web, and
   a cover flap hingedly mounted to the top web, the cover flap positioned within a window within the top web, and wherein the cover flap includes a first hook and loop fastener strip securable to a second hook and loop fastener strip mounted to the top web, and
   a radio receiver unit mounted within the enclosure projecting into the window under the cover flap, and
   a speaker member medially directed through the top web in audio communication with the radio receiver unit, and
   a television transmitter antenna, including an antenna body, wherein the antenna body includes a plurality of adhesive strips, the adhesive strips are arranged for securement to a television housing, and the antenna including a connector member directed into the television audio output for directing an audio signal to the radio receiver unit, and
   a serpentine pneumatic chamber coextensively directed throughout the enclosure within the pillow casing, and an inflation valve in pneumatic communication with the pneumatic chamber projecting through the casing for effecting selective inflation of the chamber, and the speaker member includes a speaker housing, the speaker housing positioned within a housing member, the housing member including fluid filled wall structure in surrounding relationship relative to the speaker housing, and the housing member further defining a housing cavity receiving the speaker housing, and the housing cavity including a plurality of first deformable fluid filled capsules contained within the housing cavity between the speaker housing and the fluid filled walls.

2. An apparatus as set forth in claim 1 wherein the serpentine pneumatic chamber includes a plurality of second deformable fluid filled capsules coextensively directed throughout the pneumatic chamber permitting compression of the capsules affording cushioning to the radio receiver unit and the speaker member, as well as affording comfort to a user of the pillow casing.

* * * * *